United States Patent [19]

Sasaki et al.

[11] 4,337,155
[45] Jun. 29, 1982

[54] CHEMICAL-RESISTANT WHOLLY AROMATIC POLYAMIDE FIBER MATERIAL

[75] Inventors: Hideharu Sasaki; Yorikazu Tamura; Keizo Shimada, all of Iwakuni, Japan

[73] Assignee: Teijin Limited, Osaka, Japan

[21] Appl. No.: 225,036

[22] Filed: Jan. 14, 1981

[30] Foreign Application Priority Data

Jan. 22, 1980 [JP] Japan ................................ 55-5219

[51] Int. Cl.³ ...................... B01D 31/00; D02G 3/00
[52] U.S. Cl. ................................ 210/500.1; 428/225; 428/255; 428/288; 428/361; 428/395
[58] Field of Search ............... 428/361, 224, 375, 378, 428/395, 421, 422, 288, 290, 255, 225; 210/500.1, 500.2; 139/420 R, 426 R

[56] References Cited

U.S. PATENT DOCUMENTS

| | | | |
|---|---|---|---|
| 3,097,990 | 7/1963 | Holly | 428/375 |
| 4,029,585 | 6/1977 | Dettre | 428/42 LX |
| 4,075,172 | 2/1978 | Ozawa et al. | 528/337 X |
| 4,165,404 | 8/1979 | Quehl | 428/422 X |
| 4,217,227 | 8/1980 | Elfert et al. | 210/500.2 |
| 4,234,839 | 1/1980 | Marshall | 428/375 X |

Primary Examiner—Lorraine T. Kendell
Attorney, Agent, or Firm—Burgess, Ryan and Wayne

[57] ABSTRACT

A wholly aromatic polyamide fiber material having an excellent resistance to chemicals, comprises wholly aromatic polyamide fibers each covered with a coating of a fluorine-containing polymeric resin which coating has been derived from an aqueous emulsion of the fluorine-containing polymer resin.

15 Claims, No Drawings

CHEMICAL-RESISTANT WHOLLY AROMATIC POLYAMIDE FIBER MATERIAL

BACKGROUND OF THE INVENTION

The present invention relates to a chemical-resistant wholly aromatic polyamide fiber material. More particularly, the present invention relates to a wholly aromatic polyamide fiber material having an enhanced resistance to chemicals such as alkali and acid, and also to heat.

It is known that the so-called wholly aromatic polyamide resins have higher softening and melting points than those of aliphatic polyamide resins, and exhibit desirable physical and chemical properties, such as: excellent heat-resisting properties, for example, a high ratio of mechanical strength at an elevated temperature compared to that of at room temperature, superior stabilities in dimension and shape at an elevated temperature, and a high resistance to thermal decomposition; high resistances to various chemicals, and, superior mechanical properties, for example, a high tensile strength and high Young's modulus. Also, it is known that the wholly aromatic polyamide resins have high orienting and crystallizing properties. Accordingly, the wholly aromatic polyamide resins are suitable as a material for producing filaments, fibers and films having a high heat resistance, a superior flame-retarding property, and high tensile strength and Young's modulus.

Also, it is known that in various types of industires, various types of fluids (gases and liquids) are filtered with filter cloths. The fluids to be filtered sometimes have an elevated temperature and/or contain various chemicals, for example, acid substances such as hydrogen chloride (hydrochloric acid), sulfur dioxide (sulfurous acid anhydride), sulfur trioxide (sulfuric acid anhydride) and sulfuric acid, and alkaline substances such as sodium hydroxide and potassium hydroxide. Therefore, the filter cloth should exhibit satisfactory resistance not only to elevated temperatures, but also, to various chemicals, in addition to having a satisfactory filtering property.

In view of the above-mentioned preferable properties of the wholly aromatic polyamide resins, it is expected that the wholly aromatic polyamide fibers are useful for producing a filter cloth suitable for filtering various fluids having an elevated temperature and containing various chemicals.

Hitherto, the filter cloth resistant to heat and chemicals were produced from inorganic fibers, for example, glass fibers or asbestos fibers, or synthetic organic fibers, for example, polyethylene terephthalate fibers or poly-m-phenylene isophthalate fibers. The glass fibers and asbestos fibers are highly resistant to heat and acid substances. However, the glass fibers exhibit an unsatisfactory resistance to alkaline substances, a poor filtering property to dust and a large flexural fatigue. The polyethylene terephthalate fiber cloth exhibits an excellent filtering property and resistance to flexural fatigue. However, the polyethylene terephthalate fiber cloth is unsatisfactory in its resistance to acid and alkaline substances and heat. Also, the wholly aromatic polyamide fiber cloth has an excellent filtering property and excellent resistances to heat, flexural fatigue and alkaline substances. However, the filtering cloth consisting of wholly aromatic polyamide fibers such as poly-m-phenylene isophthalate fibers exhibits an unsatisfactory resistance to acid substances.

In order to enhance the resistance of the wholly aromatic polyamide fiber cloth to the chemicals, various types of treatments on the wholly aromatic polyamide fiber cloth were attempted. However, the attempted treatments not only failed to impart a satisfactory resistance to chemicals to the wholly aromatic polyamide fiber cloth, but also, caused the filtering property of the cloth to become remarkably poor.

Accordingly, it is strongly desired to enhance the resistance of the wholly polyamide fiber material to chemicals without degrading another properties thereof, for example, the filtering property, resistance to heat or the mechanical strength thereof.

SUMMARY OF THE INVENTION

An object of the present invention is to provide a chemical-resistant wholly aromatic polyamide fiber material having not only an excellent thermal resistance, but also, an enhanced resistance to chemicals such as acid and alkaline materials.

Another object of the present invention is to provide a chemical-resistant wholly aromatic polyamide fiber material having a satisfactory filtering property and good mechanical strength.

The above-mentioned objects can be attained by the chemical-resistant wholly aromatic polyamide fiber material of the present invention which comprises wholly aromatic polyamide fibers each covered with a coating of a fluorine-containing polymeric resin, which coating has been derived from an aqueous emulsion of the fluorine-containing polymeric resin.

DETAILED DESCRIPTION OF THE INVENTION

In the chemical-resistant wholly aromatic polyamide fiber material of the present invention, each of the wholly aromatic polyamide fibers is covered with a coating of a fluorine-containing polymeric resin which has been formed from an aqueous emulsion of the resin.

The wholly aromatic polyamide fibers are preferably made from at least one aromatic polyamide containing at least 75 molar % of repeating units selected from the group consisting of those of the formulae (I) and (II):

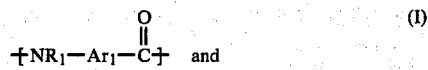

and

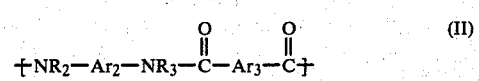

wherein $Ar_1$, $Ar_2$ and $Ar_3$ respectively present, independently from each other, an unsubstituted or substituted divalent aromatic radical which comprises a single aromatic ring, or two or more aromatic rings that are condensed together, or are linked together by a single bond, or by a bridging atom or radical, and which is oriented either meta or para, and $R_1$, $R_2$ and $R_3$ respectively represent, independently from each other, a hydrogen atom or an alkyl radical having 1 to 3 carbon atoms.

In the formulae (I) and (II), it is preferable that $Ar_1$, $Ar_2$ and $Ar_3$ be respectively selected, independently from each other, from the group consisting of the radicals of the formulae:

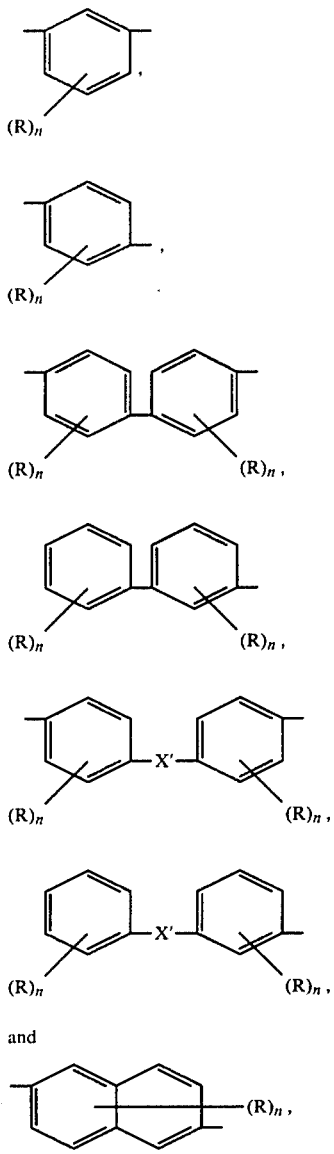

wherein R represents a member selected from the group consisting of lower alkyl radicals having 1 to 6 carbon atoms, lower alkoxy radicals having 1 to 6 carbon atoms, halogen atoms and a nitro radical, n represents zero or an integer of from 1 to 4 and X' represents a member selected from the group consisting of $$-\underset{\underset{O}{\overset{O}{\|}}}{S}-, -\underset{\underset{Y'}{\overset{Y'}{|}}}{C}-, -O-, -S-, -\underset{\underset{Y'}{|}}{N}- \text{ and } -\overset{O}{\overset{\|}{C}}-$$

wherein Y' represents a member selected from the group consisting of a hydrogen atom and lower alkyl radicals having 1 to 6 carbon atoms.

Also, in the formulae (I) and (II), it is more preferable that $Ar_1$, $Ar_2$ and $Ar_3$ respectively represent, independently from each other, a member selected from p-phenylene radical, m-phenylene radical, biphenylene radical and radicals of the formulae:

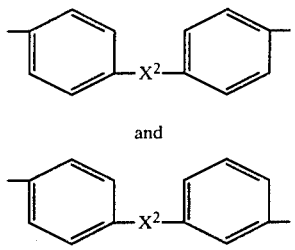

and

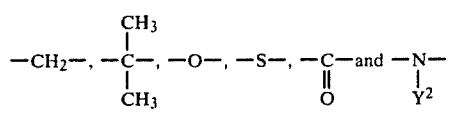

wherein $X^2$ represents a member selected from $$-CH_2-, -\underset{\underset{CH_3}{\overset{CH_3}{|}}}{C}-, -O-, -S-, -\overset{O}{\overset{\|}{C}}- \text{ and } -\underset{\underset{Y^2}{|}}{N}-$$

in which $Y^2$ represents a hydrogen atom or an alkyl radical having 1 to 3 carbon atoms.

Furthermore, in the formulae (I) and (II), it is still more preferable that $Ar_1$, $Ar_2$ and $Ar_3$ be respectively a p-phenylene or m-phenylene radical.

Moreover, it is preferable that the aromatic polyamide contain the repeating units of the formula (II) in which $Ar_2$ and $Ar_3$ are respectively a p-phenylene or m-phenylene radical, most preferably, a m-phenylene radical.

The aromatic polyamide may contain 30 molar % or less of one or more comonomers, for example, aliphatic diamines, such as hexamethylene diamine and piperazine, and aliphatic dicarboxylic acid, such as adipic acid, based on the entire molar amount of the comonomers contained in the polyamide.

The wholly aromatic polyamide fibers usable for the present invention may be in the form of a mass of loose staple fibers, loose filaments, a woven, knitted or non-woven fabric or a net. The most important wholly aromatic polyamide fiber material is in the form of a woven, knitted or non-woven fabric.

The fluorine-containing polymeric resin usable for the present invention comprises preferably at least one member selected from the group consisting of tetrafluoroethylene polymers, tetrafluoroethylene-hexafluoropropylene copolymers, tetrafluoroethylene-trifluorochloroethylene copolymers, tetrafluoroethylene-vinylidene fluoride copolymers, tetrafluoroethylene-ethylene copolymers, tetrafluoroethylene-perfluorovinyl ether copolymers, tetrafluoroethylene-carboxylic acid or sulfonic acid group-containing perfluorovinyl ether copolymers, trifluorochloroethylene polymers, vinyl fluoride polymers, vinylidene fluoride polymers, vinyl fluoride-hexafluoropropylene copolymers and vinyl chloride-trifluorochloroethylene copolymers.

Also, it is preferable that the fluorine-containing polymeric resin contains at least 30% by weight of fluorine.

In the present invention, it is important that the coating of the fluorine-containing polymeric resin is formed by applying an aqueous emulsion of the fluorine-containing polymeric resin onto the wholly aromatic polyamide fiber material and by solidifying the emulsion in situ. The aqueous emulsion of the fluorine-containing polymeric resin can form a continuous rigid coating film firmly adhered to the surface of each fiber without adhering the fibers to each other. The continuous coating film of the fluorine-containing polymeric resin can protect the wholly aromatic polyamide fiber from chemicals such as acids or alkalies even at an elevated temperature.

Also, the coated fibers are separate from each other and, therefore, do not cause the fluid-permeability of the fiber material to be decreased. Accordingly, the coating of the fibers does not result in a decrease in the filtering property of the fiber material.

If the coating of the fluorine-containing polymeric resin is formed from a solution thereof, the coated wholly aromatic polyamide fiber material exhibits a decreased degree of fluid-permeability, because the fibers are adhered to each other by the resin.

Also, when fine solid particles or an aqueous dispersion of a fluorine-containing polymeric resin is applied onto a wholly aromatic polyamide fiber material and heated thereon at a temperature higher than the melting point of the resin and lower than the melting point of the fiber material in order to form coatings of the resin on the fiber surfaces, the resultant coating films on the fiber surfaces are discontinuous and, sometimes adhere the fibers to each other. Therefore, the resultant fiber material exhibits a poor resistance to chemicals and an unsatisfactory filtering property.

A preferable aqueous emulsion of the fluorine-containing polymeric resin is one prepared by an aqueous emulsion polymerization method. However, the aqueous emulsion may be prepared by emulsifying, in water, a fluorine-containing polymeric resin which has been prepared by a dispersion polymerization method.

The fluorine-containing polymeric resins most preferable for the present invention are vinyl fluoride-hexafluoropropylene copolymers, tetrafluoroethylene-propylene copolymers, vinylidene fluoride-hexafluoropropylene copolymers, and tetrafluoroethylene-vinylidene fluoride copolymers.

Aqueous emulsions of the above-mentioned fluorine-containing polymeric resins can form a continuous rigid film on each fiber at a low temperature (for example, from 20° to 200° C. Therefore, the application of the above-mentioned resins onto the wholly aromatic polyamide fiber material is easy and the resultant products can exhibit excellent chemical-resistance and an excellent filtering property.

The application of the aqueous emulsion of the fluorine-containing polymeric resin onto the wholly aromatic polyamide fiber material can be carried out by any conventional coating method, for example, impregnating method or spraying method, and the resultant films of the aqueous emulsion formed on the fiber surfaces are dried to convert them to solid flexible films of the fluorine-containing polymeric resin.

The amount of the fluorine-containing polymeric resin coatings to be formed on the fiber surfaces is variable depending on the device of the individual fibers in the fiber material, the weight and surface area of the fiber material. However, usually, it is preferable that the amount of the fluorine-containing polymeric resin to be formed on the fiber surfaces is in the range of from 0.5 to 40% based on the weight of the fiber material. When the amount of the fluorine-containing polymeric resin is less than 0.5%, the resultant product exhibits an unsatisfactory resistance to chemicals. Also, more than 40% of the fluorine-containing polymeric resin coated on the fiber material results in a decreased softness and an unsatisfactory fluid-permeability (filtering property) of the fiber material.

The chemical-resistant wholly aromatic polyamide fiber material of the present invention exhibits an excellent resistance to chemicals and heat and a satisfactory fluid-permeability. Therefore, the fiber material of the present invention is highly useful for various uses in which the fiber material is employed at an elevated temperature in the presence of various acid and/or alkali substances. For example, the chemical-resistant wholly aromatic polyamide fiber material of the present invention is useful as a filtering material, for instance, filter cloth and filtering fiber mass (web), for filtering exhaust gases from waste material-burning furnaces, boilers, blast furnaces, open-hearth furnaces, convertors, sintering furnaces and cupolas, exaust gases of which have an elevated temperature and contain acid substances, for instance, $SO_2$ and $SO_3$, together with dust. Also, the fiber material of the present invention is useful as a filter cloth for various aqueous liquids containing alkaline substances, for instance, KOH or NaOH, together with solid particles, at an elevated temperature.

SPECIFIC EMBODIMENTS

In order to more thoroughly illustrate the present invention and its relation to the prior art, the following examples are presented.

In the examples, the air-permeability of a fiber material was determined in the following manner.

A fiber material to be tested is placed and fixed in the middle portion in the inside space of a cylinder having an inside diameter of 9 cm and a length of 60 cm, so as to separate the inside space into an upstream portion and a downstream portion thereof. Pressurized air was flowed into the upstream portion of the cylinder under a predetermined pressure at a speed of 2 m/sec. The pressure and speed of the air stream created in the downstream portion of the cylinder were measured by using a manometer. Differences in pressure and speed between the air streams in the upstream and downstream portions of the cylinder were determined. A pressure loss due to the fiber material was expressed by the pressure difference (mm $H_2O$) per speed difference (m/sec) of the air stream.

The resistance of the fiber material to acid substance were evaluated in the following manner.

A film fabric to be tested was immersed in an aqueous solution of 5% by weight of sulfuric acid for one minute at room temperature, removed from the solution and squeezed so that the amount of the solution remaining in the fabric corresponds to 100% of the weight of the fabric. The fabric impregnated with the sulfuric acid aqueous solution was heated at a temperature of 150° C. for one hour.

The above-mentioned procedures were repeated five times. The tensile strength and ultimate elongation of the above-treated fabric were compared with those of the non-treated fabric.

In the case where the fiber material to be tested is a multifilament yarn, the above-mentioned procedures were carried out, except that both ends of the filament yarns having a length of 20 cm were fixed on a testing frame and after the immersing operation, the filament yarn was directly subjected to the heating operation without applying the squeezing operation to be filament yarn.

EXAMPLES 1 TO 4 AND COMPARISON EXAMPLE 1

In each of the Examples 1 to 4, a spinning solution of 20% by weight of a poly-(m-phenylene isophthalamide) having an intrinsic viscosity of 1.9 which has been determined in a 0.5 g/100 ml solution thereof in concentrated sulfuric acid at a temperature of 30° C., in N-methyl-2-pyrrolidone, was extruded through a spinneret having 100 spinning holes, and the resultant streams of the spinning solution was introduced into an aqueous coagulating solution containing 40% by weight of calcium chloride. The coagulated, undrawn filaments were washed with water to completely remove the N-methyl-2-pyrrolidone from the coagulated filaments and an oiling agent was applied onto the filaments. The oiled filaments were drawn at a draw ratio of 3 in a boiling water bath, and then, additionally drawn and heat-treated at a draw ratio of 1.3 on a heating plate having a temperature of 320° C. The heat-treated filaments were crimped by using a stuffing box type crimping machine and, then, cut to provide staple fibers having a length of 51 mm and a denier of 1.5.

The staple fibers were converted into a felt having a weight of 150 g/m² by using a needle-punching machine.

The felt was washed with acetone to remove the oiling agent from the felt and, then, dried.

The dried felt exhibited a tensile strength of 13.8 Kg/1 cm and an ultimate elongation of 28.9%. The dried felt was immersed in an aqueous emulsion of a copolymer (F 16) of 80 molar % of vinyl fluoride with 20 molar % of hexafluoropropylene in a concentration as indicated in Table 1 and squeezed so that an amount of the copolymer an indicated in Table 1 was held by the felt. The squeezed felt was dried at a temperature of 90° C. for two hours, washed with water and, finally, dried.

The air permeability of the dried felt was determined. Also, the dried felt was subjected to one operation of the acid immersion-heat treatment test at a temperature of 150° C. for one hour. The tensile strength and ultimate elongation of the tested felt were determined.

The degree A of acid-resistance in tensile strength of the felt was determined in accordance with the equation:

$$A\ (\%) = \frac{\text{Tensile strength of acid-treated felt}}{\text{Tensile strength of non-acid treated felt}} \times 100$$

The degree B of acid-resistance in ultimate elongation of the felt was determined in accordance with the equation:

$$B\ (\%) = \frac{\text{Ultimate elongation of acid treated felt}}{\text{Ultimate elongation of non-acid treated felt}} \times 100$$

The results are indicated in Table 1.

In comparison Example 1, the same procedures as those mentioned above were carried out, except that no fluorine-containing polymeric resin emulsion was applied to the felt.

TABLE 1

| Example No. | Concentration of F-16 resin in aqueous emulsion | Amount of resin coating (% based on weight of felt) | Air-permeability (mmH₂O/m/s) | Acid-treated felt Tensile strength (Kg/1 cm) | Acid-treated felt Ultimate elongation (%) | Acid-resistance (%) Tensile strength | Acid-resistance (%) Ultimate elongation |
|---|---|---|---|---|---|---|---|
| Example 1 | | 2.0 | 37 | 13.5 | 29.7 | 101 | 103 |
| Example 2 | | 3.4 | 35 | 13.6 | 28.7 | 99 | 99 |
| Example 3 | | 4.8 | 32 | 16.2 | 33.1 | 117 | 115 |
| Example 4 | | 14.0 | 33 | 17.5 | 32.4 | 127 | 112 |
| Comparison Example 1 | 0 | 0 | 37 | 8.2 | 15.5 | 57 | 54 |

Table 1 clearly shows that the air-permeability of the F-16 resin-treated felts in Examples 1 to 4 are similar to that of the non-treated felt. However, the acid resistance of the F-16 resin-treated felts is significantly superior to that of the non-treated felt.

EXAMPLES 5 AND 6 AND COMPARISON EXAMPLE 2

In each of Examples 5 and 6, the same procedures as those described in Example 1 were carried out, except that the amount of the resin F-16 coating on the felt was as indicated in Table 2, and the resin F-16-treated felt was repeatedly acid-treated five times. The results are indicated in Table 2.

In Comparison Example 2, the same procedures as those described above were carried out, except that no resin F-16 treatment was applied to the felt. The results are indicated in Table 2.

TABLE 2

| | Example N | Tensile strength of felt (Kg/1 cm) | |
|---|---|---|---|
| Item | Example 5 | Example 6 | Comparison Example 2 |
| Amount of resin F-16 coating (% based on weight of felt) | 2 | 4 | 0 |
| Before acid treatment | 15.6 | 16.2 | 13.2 |
| After first acid treatment | 16.4 | 15.4 | 5.6 |
| After second acid treatment | 14.4 | 15.9 | 4.9 |
| After third acid treatment | | | |
| After fourth acid treatment | 15.4 | 14.7 | 3.8 |
| After fifth acid treatment | 14.2 | 15.3 | 2.7 |

EXAMPLES 7 TO 10 AND COMPARISON EXAMPLE 3

In each of the Examples 7 to 10, the same procedures as chose discribed in Example 1 were carried out, except that the amount of the resin F-16 coating was as indicated in Table 3 and the heating procedure for the acid-impregnated felt was carried out at a temperature of 200° C. for three hours. The results are indicated in Table 3.

In Comparison Example 3, the same procedure as those as mentioned above were carried out, except that no resin F-16 was applied to the felt. The results are shown in Table 3.

TABLE 3

| Example No | Amount of resin coating (% based on weight of felt) | Acid-treated felt Tensile strength (kg/1 cm) | Acid-treated felt Ultimate elongation (%) | Acid-resistance (%) Tensile strength | Acid-resistance (%) Ultimate elongation |
|---|---|---|---|---|---|
| Example 7 | 2.1 | 12.2 | 22 | 88 | 65 |
| Example 8 | 6.2 | 12.4 | 22 | 90 | 65 |
| Example 9 | 17.1 | 14.0 | 25 | 101 | 74 |
| Example 10 | 31.1 | 23.4 | 38 | 170 | 112 |
| Comparison Example 3 | 0 | 3.7 | 10 | 27 | 29 |

EXAMPLE 11 AND COMPARISON EXAMPLE 4

In Example 11, a multifilament yarn consisting of a poly-p-phenylene terephthalamide and having a yarn count of 200 denier/100 filaments was coated with 4%, based on the weight of the yarn, of the resin F-16. The coated multifilament yarn was subjected to the same acid treatment as that described in Example 1. The acid-resistance in tensile strength was 97% and the acid-resistance in ultimate elongation was 92%.

In Comparison Example 4, the same procedures as those mentioned above were carried out, except that no resin F-16 was applied to the multifilament yarn. The acid-resistance in tensile strength was 52% and the acid-resistance in ultimate elongation was 40%.

EXAMPLE 12 AND COMPARISON EXAMPLE 5

The same procedures as those described in Example 11 were applied to a multifilament yarn consisting of a wholly aromatic polyamide made of an amine component consisting of 50 molar % of 3,4'-oxydianiline and 50 molar % of p-phenylene diamine and an acid component consisting of terephthalic acid chloride. The multifilament yarn had a yarn count of 200 denier/100 filaments.

Acid resistance in tensile strength: 99%
Acid resistance in ultimate elongation: 96%

In Comparison Example 5, the same procedures as those described in Example 12 were carried out, except no resin F-16 was applied to the multifilament yarn.

Acid-resistance in tensile strength: 83%
Acid-resistance in ultimate elongation: 85%

COMPARISON EXAMPLE 6

The same procedures as those described in Example 1 were carried out, except that a solution of 5% by weight of the resin F-16 in methylethyl ketone was used in place of the aqueous emulsion of therein F-16.

Air permeability: 65 mm H$_2$O/m/s
Acid-resistance in tensile strength: 103%
Acid-resistance in ultimate elongation: 98%

That is, the solution of the resin F-16 in an organic solvent caused the resultant felt to exhibit a poor air permeability.

We claim:

1. A chemical-resistant wholly aromatic polyamide fiber material, comprising wholly aromatic polyamide fibers each comprising at least one aromatic polyamide containing repeating units selected from the group consisting of those of the formulae (I) and (II):

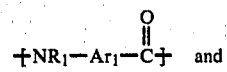

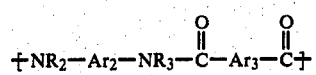

wherein Ar$_1$, Ar$_2$, and Ar$_3$ respectively present, independently from each other, an unsubstituted or substituted divalent aromatic radical which comprises a single aromatic ring, or two or more aromatic rings that are condensed together, or are linked together, by a single bond, or by a bridging atom or radical, and which is oriented either meta or para, and R$_1$, R$_2$ and R$_3$ each represent independently from each other, a hydrogen atom or an alkyl radical having 1 to 3 carbon atoms, each of which fibers is covered with a coating of a fluorine-containing polymeric resin comprising at least one member selected from the group consisting of tetrafluoroethylene polymers, tetrafluoroethylene-hexafluoropropylene copolymers, tetrafluoroethylene-trifluorochloroethylene copolymers, tetrafluoroethylene-vinylidene fluoride copolymers, tetrafluoroethyleneperfluorovinyl ether copolymers, tetrafluoroethylene-carboxylic acid or sulfonic acid group-containing perfluorovinyl ether copolymers, trifluorochloroethylene polymers, vinyl fluoride polymers, vinylidene fluoride polymers, vinyl fluoride-hexafluoropropylene copolymers, and vinyl chloride-trifluorochloroethylene copolymers, said coating having been derived from an aqueous emulsion of said fluorine-containing polymeric resin.

2. A chemical-resistant wholly aromatic polyamide fiber material as claimed in claim 1, wherein said Ar$_1$, Ar$_2$ and Ar$_3$ in said formulae (I) and (II) are respectively selected, independently from each other, from the group consisting of the radicals of the formulae:

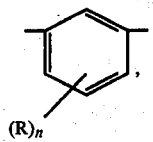

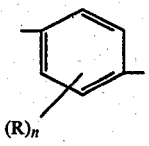

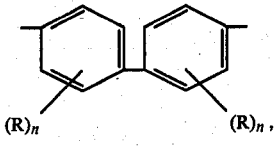

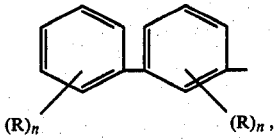

-continued

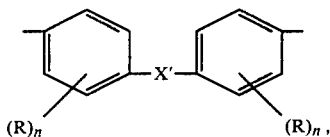

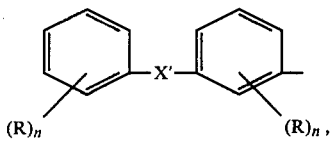

and

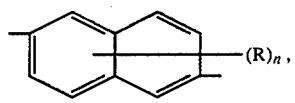

wherein R represents a member selected from the group consisting of lower alkyl radicals having 1 to 6 carbon atoms, lower alkoxy radicals having 1 to 6 carbon atoms, halogen atoms and a nitro radical, n represents zero or an integer of from 1 to 4 and X' represents a member selected from the group consisting of

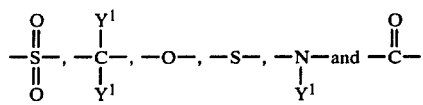

wherein $Y^1$ represents a member selected from the group consisting of a hydrogen atom and lower alkyl radicals having 1 to 6 carbon atoms.

3. A chemical-resistant wholly aromatic polyamide fiber material as claimed in claim 1, wherein said $Ar_1$, $Ar_2$ and $Ar_3$ in the formulae (I) and (II) respectively represent, independently from each other, a member selected from p-phenylene radical, m-phenylene radical, biphenylene radical and radicals of the formulae:

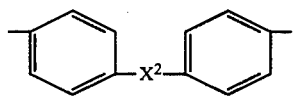

and

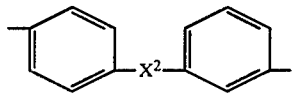

wherein $X^2$ represents a member selected from

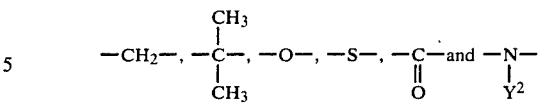

in which $Y^2$ represents a hydrogen atom or a alkyl radical having 1 to 3 carbon atoms.

4. A chemical-resistant wholly aromatic polyamide fiber material as claimed in claim 1, wherein said aromatic polyamide contains repeating units of the formula (II) in which said $Ar_2$ and $Ar_3$ represent, independently from each other, a m-phenylene or p-phenylene radical.

5. A chemical-resistant wholly aromatic polyamide fiber as claimed in claim 4, wherein both said $Ar_2$ and $Ar_3$ in the formula (II) represent a m-phenylene radical.

6. A chemical-resistant wholly aromatic polyamide fiber material as claimed in claim 1, wherein said fiber material is in the form of a mass of loose staple fibers.

7. A chemical-resistant wholly aromatic polyamide fiber material as claimed in claim 1, wherein said fluorine-containing polymeric resin contains at least 30% by weight of fluorine.

8. A chemical-resistant wholly aromatic polyamide fiber material as claimed in claim 1, wherein said aqueous emulsion of said fluorine-containing polymeric resin is one prepared by an aqueous emulsion polymerization method.

9. A chemical-resistant wholly aromatic polyamide fiber material as claimed in claim 1, wherein the amount of said resinous coating is in the range of from 0.5 to 40% based on the entire weight of said wholly aromatic polyamide fibers.

10. A chemical-resistant wholly aromatic polyamide fiber material as claimed in claim 1, wherein said fiber material is in the form of loose filaments.

11. A chemical-resistant wholly aromatic polyamide fiber material as claimed in claim 1, wherein said fiber material is in the form of a woven fabric.

12. A chemical-resistant wholly aromatic polyamide fiber material as claimed in claim 1, wherein said fiber material is in the form of a knitted fabric.

13. A chemical-resistant wholly aromatic polyamide fiber material as claimed in claim 1, wherein said fiber material is in the form of a non-woven fabric.

14. A chemical-resistant wholly aromatic polyamide fiber material as claimed in claim 1, wherein said fiber material is in the form of a net.

15. A filtering material made of a chemical-resistant wholly aromatic polyamide fiber material as claimed in claim 1.

* * * * *